US011579830B2

(12) United States Patent
Zong et al.

(10) Patent No.: US 11,579,830 B2
(45) Date of Patent: Feb. 14, 2023

(54) DISPLAYING A WINDOW OF A REMOTE DESKTOP COMPUTER ON A MOBILE DEVICE WITH A NATIVE LAYOUT

(71) Applicant: International Business Machines Corporation, Armonk, NY (US)

(72) Inventors: Dong Jun Zong, Beijing (CN); Da Li Liu, Beijing (CN); Yue Wang, Beijing (CN); Jing Xing, Beijing (CN); Jian Fang Zhang, Beijing (CN); Qi Feng Huo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 16/176,845

(22) Filed: Oct. 31, 2018

(65) Prior Publication Data

US 2020/0133616 A1 Apr. 30, 2020

(51) Int. Cl.
*G06F 3/14* (2006.01)
*G09G 5/391* (2006.01)
*G06F 9/451* (2018.01)

(52) U.S. Cl.
CPC ............ *G06F 3/1454* (2013.01); *G06F 9/452* (2018.02); *G09G 5/391* (2013.01)

(58) Field of Classification Search
CPC .... G06F 3/1454; G06F 9/452; G06F 15/0291; G06F 1/1626; G06F 3/0482; G06F 3/0483; G06F 2200/1614; G06F 1/1656; G06F 1/1694; G06F 2200/1637; G09G 5/391
See application file for complete search history.

(56) References Cited

U.S. PATENT DOCUMENTS 8,976,210 B2 3/2015 Heyman et al.
2010/0269048 A1 10/2010 Pahlavan et al.
(Continued)

FOREIGN PATENT DOCUMENTS

CN 107256153 A 10/2017

OTHER PUBLICATIONS

Baidu, "Window Handle", Baidu, https://baike.baidu.com/item/%E7%AA%97%E5%8F%A3%E5%8F%A5%E6%9F%84/726537?fr=aladdin, Baidu, [retrieved Oct. 27, 2018].
(Continued)

*Primary Examiner* — Jennifer N Welch
*Assistant Examiner* — K C Chen
(74) *Attorney, Agent, or Firm* — Anthony Curro

(57) ABSTRACT

Embodiments generally enable a mobile device to display a window of a remote desktop on a mobile device with a native layout. In some embodiments, a method includes receiving a remote desktop display request from a mobile client device, wherein the remote desktop display request includes display information of the mobile client device. The method further includes generating a copy of a window process of a remote desktop computer. The method further includes generating a virtual display based at least in part on the copy of the window process of the remote desktop computer and on the display information of the mobile client device. The method further includes sending virtual display information to the mobile client device based at least in part on the virtual display.

15 Claims, 14 Drawing Sheets

(56) References Cited

U.S. PATENT DOCUMENTS

| | | | |
|---|---|---|---|
| 2011/0246904 A1* | 10/2011 | Pinto | G06F 9/452 715/740 |
| 2011/0271198 A1* | 11/2011 | Brakensiek | H04L 67/14 715/744 |
| 2012/0075204 A1* | 3/2012 | Murray | G06F 3/0416 345/173 |
| 2012/0264516 A1* | 10/2012 | Rudchenko | A63F 13/426 463/36 |
| 2012/0311564 A1* | 12/2012 | Khalid | H04L 67/1097 718/1 |
| 2013/0055102 A1 | 2/2013 | Matthews et al. | |
| 2013/0067469 A1* | 3/2013 | Das | G06F 9/5077 718/1 |
| 2014/0026057 A1* | 1/2014 | Kimpton | G06F 9/451 715/733 |
| 2014/0121845 A1* | 5/2014 | Mueller | G05D 7/0629 700/282 |
| 2014/0267281 A1 | 9/2014 | Heyman et al. | |
| 2015/0128061 A1 | 5/2015 | Lesner | |
| 2015/0143271 A1 | 5/2015 | Sanders et al. | |
| 2016/0055021 A1* | 2/2016 | Beveridge | G06F 9/45558 718/1 |
| 2016/0072872 A1* | 3/2016 | Li | H04L 67/025 715/740 |
| 2016/0364200 A1* | 12/2016 | Beveridge | G06F 9/452 |
| 2016/0364201 A1* | 12/2016 | Beveridge | G06F 9/452 |
| 2018/0165170 A1* | 6/2018 | Hegdal | G06F 8/60 |
| 2019/0018719 A1* | 1/2019 | Brin | H04L 67/40 |

OTHER PUBLICATIONS

CSDN, "WinAPI", CSDN, https://blog.csdn.net/dszgf5717/article/details/59108005, [retrieved Oct. 27, 2018].

GitHub, "What Is a Virtual Monitor?", GitHub, http://virtualmonitor.github.io, 2013.

SegmentFault, "kindle499", SegmentFault, https://segmentfault.com/a/1190000008424493, [retrieved Oct. 27, 2018].

Wikipedia, "Fork (system call)", Wikipedia, https://en.wikipedia.org/wiki/Fork_(system_call), Sep. 28, 2018.

* cited by examiner

| No. of Bytes | Type (Value) | Description | Type (Value) |
|---|---|---|---|
| 1 | U8 | Shared-flag | 0 |
| 1 | U8 | Content-layout-flag | 1 |
| 16 | U8 | Device-size | 5.2" |
| 16 | U8 | Device-resolution | 1980 x 1720 |

| Index | Main (Main Screen) | Mobile | Pad | Name |
|---|---|---|---|---|
| 0 | {<br>  handleId:1234,<br>  position:{400,300},<br>  size:{100,100},<br>} | {<br>  handleId:2345,<br>  position:{50,30},<br>  size:{50,50},<br>} | {<br>  handleId:3456,<br>  position:{60,40},<br>  size:{60,60},<br>} | Save |

|      1102 |              1104 |      1106 |      1108 |      1110 |
|-----------|-------------------|-----------|-----------|-----------|
| Index     | Main (Main Screen)| Mobile    | Pad       | Character |
| 307       | 480, 100          | 370, 400  | 400, 500  | .         |
| 308       | 400, 120          | 20, 430   | 30, 530   | T         |
|           |                   |           |           |           |

|      1102 |              1104 |      1106 |      1108 |      1110 |
|-----------|-------------------|-----------|-----------|-----------|
| Index     | Main (Main Screen)| Mobile    | Pad       | Character |
| 307       | 480, 100          | 370, 400  | 400, 500  | .         |
| 308       |                   |           |           |           |
| 309       | 400, 120          | 20, 430   | 30, 530   | T         |
|           |                   |           |           |           |

|      1102 |              1104 |      1106 |      1108 |      1110 |
|-----------|-------------------|-----------|-----------|-----------|
| Index     | Main (Main Screen)| Mobile    | Pad       | Character |
| 307       | 480, 100          | 370, 400  | 400, 500  | .         |
| 308       | 500, 100          |           |           | A         |
| 309       | 400, 120          | 20, 430   | 30, 530   | T         |
|           |                   |           |           |           |

|      1102 |              1104 |      1106 |      1108 |      1110 |
|-----------|-------------------|-----------|-----------|-----------|
| Index     | Main (Main Screen)| Mobile    | Pad       | Character |
| 307       | 480, 100          | 370, 400  | 400, 500  | .         |
| 308       | 500, 100          | 400, 400  | 420, 500  | A         |
| 309       | 400, 120          | 20, 430   | 30, 530   | T         |
|           |                   |           |           |           |

DISPLAYING A WINDOW OF A REMOTE DESKTOP COMPUTER ON A MOBILE DEVICE WITH A NATIVE LAYOUT

BACKGROUND

Mobile devices are widely used. In some applications, a mobile device may be used to access and operate a remote desktop computer, where the mobile device displays the window of the remote desktop computer. However, the display size of the mobile device can be substantially smaller than that of the remote desktop computer, which can result in the content of the window being distorted and difficult for a user to read or operate the controls of the window.

SUMMARY

Disclosed herein is a method for displaying a window of a remote desktop on a mobile device with a native layout, and system and computer program product as specified in the independent claims. Embodiments are given in the dependent claims. Embodiments can be freely combined with each other if they are not mutually exclusive.

In some embodiments, a method includes receiving a remote desktop display request from a mobile client device, where the remote desktop display request includes display information of the mobile client device. The method further includes generating a copy of a window process of a remote desktop computer. The method further includes generating a virtual display based at least in part on the copy of the window process of the remote desktop computer and on the display information of the mobile client device. The method further includes sending virtual display information to the mobile client device based at least in part on the virtual display.

In another embodiment, the display information includes a size of the mobile device. In another aspect, the display information includes a resolution of the mobile device. In another aspect, the copy of the window process is based on a fork operation. In another aspect, a resolution of the remote desktop computer is preserved so as to allow for other mobile client devices to access the remote desktop computer. In another aspect, the virtual display information includes frame buffer information. In another aspect, the method further includes invoking a frame buffer manager of the remote desktop computer, where the frame buffer manager communicates with a frame buffer manager of the mobile client device.

BRIEF DESCRIPTION OF THE DRAWINGS

FIG. 4 is an example data structure that includes display information, according to some embodiments.

FIG. 8 is an example mapping table that includes display information, according to some embodiments.

FIG. 11A is an example mapping table that includes display information, according to some embodiments.

FIG. 11B is an example mapping table that includes display information, according to some embodiments.

FIG. 11C is an example mapping table that includes display information, according to some embodiments.

FIG. 11D is an example mapping table that includes display information, according to some embodiments.

DETAILED DESCRIPTION

Embodiments described herein enable a mobile device to display a window of a remote desktop with a native layout. In various embodiments, the system generates a layout based on the display screen of each different mobile device that is connected to the remote desktop computer.

In some embodiments, a system receives a remote desktop display request from a mobile client device, where the remote desktop display request includes display information of the mobile client device. The system includes generating a copy of a window process of a remote desktop computer. The system generates a virtual display based at least in part on the copy of the window process of the remote desktop computer and on the display information of the mobile client device. The system sends virtual display information to the mobile client device based at least in part on the virtual display.

Figure 1:
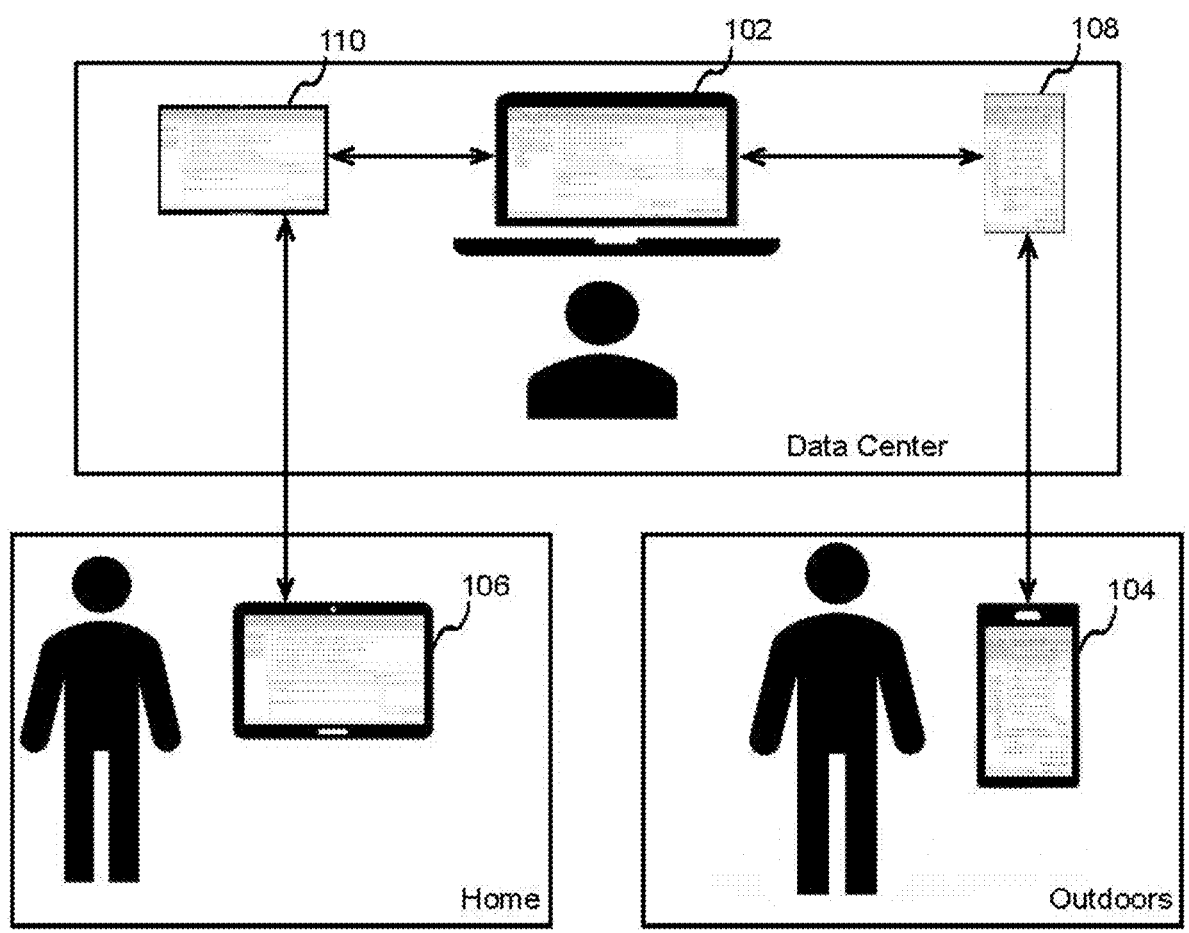
FIG. 1 is an example environment for displaying a window of a remote desktop on one or more mobile devices with a native layout, according to some embodiments.

FIG. 1 is an example environment for displaying a window of a remote desktop on one or more mobile devices with a native layout, according to some embodiments. Shown are a desktop computer 102, a mobile device 104, and a mobile device 106. In this particular example, mobile device 104 is a cell phone and mobile device 106 is a tablet. These mobile devices may be referred to as mobile client devices or client devices. The particular types of mobile devices may vary, depending on the particular implementations.

In various implementations, desktop computer 102 is remote from mobile devices 104 and 106. For example, desktop computer 102 may be at a data center, or any remote location relative to mobile devices 104 and 106. In this particular example, mobile device 104 is outdoors, and mobile device 106 is in a user's home. Mobile devices 104 and 106 being mobile may travel indoors or outdoors. Desktop computer 102 and mobile devices 104 and 106 may communicate via any suitable network or combination of networks (e.g., Internet, cellular network, etc.).

As described in more detail herein, desktop computer 102 extends a virtual display with suitable resolution to mobile device 104. As used herein, a "virtual display" is a screen image or window that shows information from the window of the source computer such as desktop computer 102, yet the screen image or window of the virtual display is shown on one or more other devices such as mobile device 104 as if native to each respective device. In other words, a window displayed on desktop computer 102 is presented remotely on mobile device 104. As such, the user of mobile device 104 is looking at a virtual display from desktop computer 102, which looks native to the mobile device.

Desktop computer 102 extends a virtual display with suitable resolution to mobile device 106. As may be seen in FIG. 1, portions of a screen image or window of a virtual display are rendered on the mobile devices 104 and 106. Such virtual displays 108 and 110 enable mobile devices 104 and 106 to display the same information that desktop computer 102 displays in a native layout. For example, with a native layout, each mobile device displays at least a portion of the same information as shown on desktop computer 102, but with the proper sizing and resolution unique to each mobile device. Further embodiments are described in more detail herein.

In various embodiments, mobile devices 104 and 106 have different display sizes from each other and different from the display size of desktop computer 102. In this example, mobile devices 104 and 106 have smaller display size from desktop computer 102. In other embodiments, a given mobile device may have larger display from that of the desktop computer, depending on the particular implementation. For example, in some implementations, a desktop computer may be a laptop computer sitting on a desk. As such, a laptop computer may have small display relative to a large display of tablet. Embodiments described herein apply to these situations as well. As such, the desktop computer may also be referred to as the main computer with a VNC server, while mobile devices may be referred to as viewing devices with VNC clients. While the desktop computer 102 is referred to in various embodiments as a "desktop" computer, in other embodiments the computer 102 may be any type of computer, such as a mobile device computer. It is not required that the computer 102 be a desktop computer. Similarly, while mobile devices 104 and 106 are referred to in various embodiments with the modifier "mobile," in other embodiments the devices 104 and 106 may be any type of computer, such as a desktop or other computer generally situated at a fixed location. It is not required that the devices 104 and 106 be mobile. Note that the terms display, display screen, and screen may be used interchangeably.

For ease of illustration, FIG. 1 shows one block for each of desktop computer 102, and mobile devices 104 and 106. Blocks 102, 104, and 106 may represent multiple desktop computers and mobile devices. For example, there may be any number of mobile client devices. In other implementations, environment 100 may not have all of the components shown and/or may have other elements including other types of elements instead of, or in addition to, those shown herein.

Figure 2:
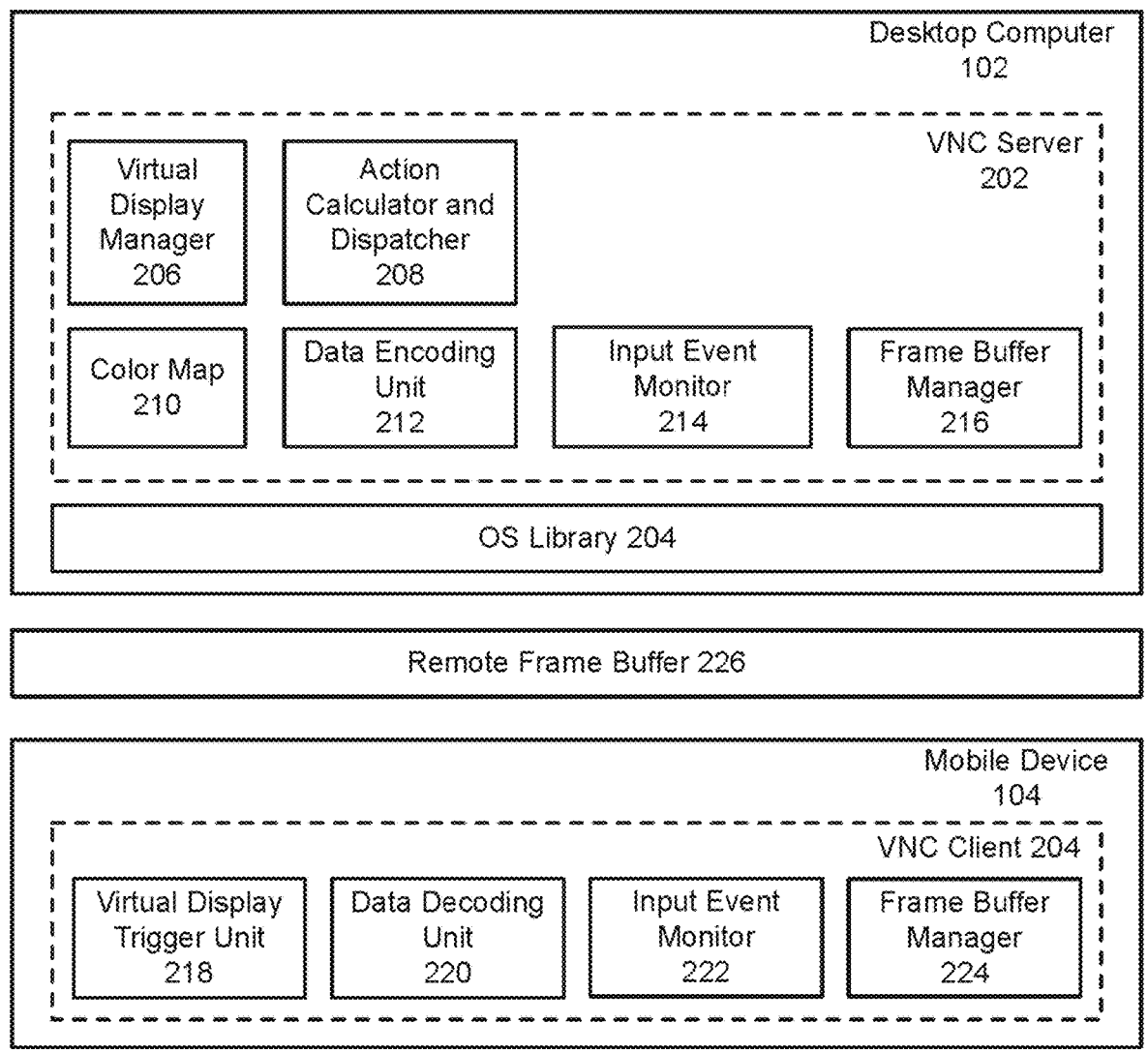
FIG. 2 is a block diagram of a desktop computer and a mobile device with a respective virtual network computing (VNC) server and VNC client, which may be used for embodiments described herein.

FIG. 2 is a block diagram of a desktop computer and a mobile device with a respective virtual network computing (VNC) server and VNC client, which may be used for embodiments described herein. As shown, desktop computer 102 includes a VNC server 202 and an operating system (OS) library 204. In some embodiments, VNC server 202 includes a virtual display manager 206, an action calculator and dispatcher 208, a color map 210, a data encoding unit 212, an input event monitor 214, and a frame buffer manager 216.

Mobile device 104 includes a VNC client 204 that communicates with VNC server 202. In some embodiments, VNC client 204 includes a virtual display trigger unit 218, a data decoding unit 220, an input event monitor 222, and a frame buffer manager 224. Input Event Monitor 222 may detect input from various types of input devices (e.g., touch screen, mouse, keyboard, etc.). Also shown is a remote frame buffer (RFB) 226. Operations of VNC server 202, VNC client 204, RFB 226, and their respective components are described in more detail herein.

In various embodiments, each of desktop computer 102 and a mobile device 104 may not have all of the components shown and/or may have other elements including other types of components instead of, or in addition to, those shown herein. Also, while some embodiments are described herein in the context of a single mobile device (e.g., mobile device 104), these embodiments and others also apply to multiple mobile devices (e.g., mobile device 106, etc.). In various embodiments, virtual display manager 206 of desktop computer 102 forks (copies) the window process of desktop computer 102 and generates a virtual display based the display of the target mobile device, such as mobile device 104.

In various embodiments, virtual display trigger unit 218 of mobile device 104 detects content-layout mode triggers and enables content-layout mode. In some embodiments, a user may click a button to switch to content-layout mode. Virtual display trigger unit 218 sends a remote desktop display request to desktop computer 102 in order to display an application in the full screen of mobile device 104. Frame buffer manager 224 performs remote display resolution management, including selecting a supported resolution appropriate for the mobile device. This results in an optimal layout of content in the display of the mobile device.

Figure 3:
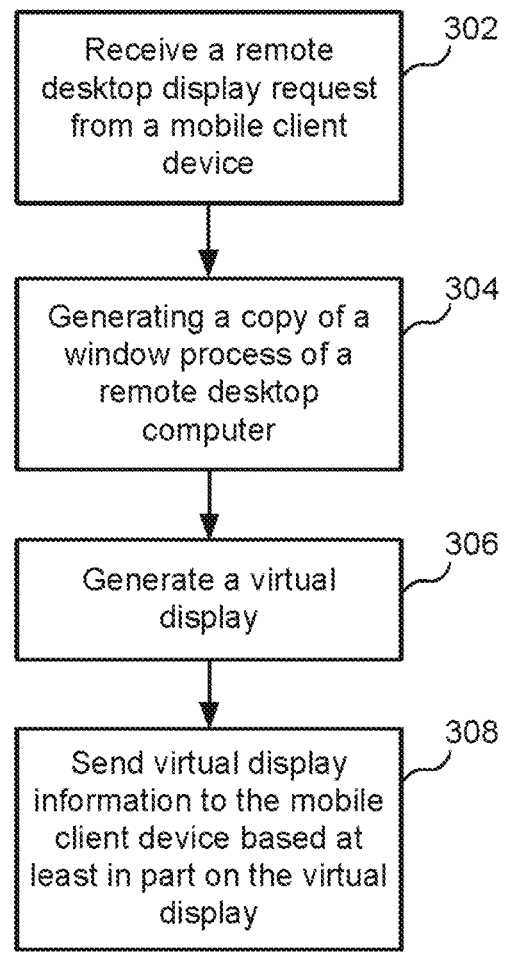
FIG. 3 is an example flow diagram for displaying a window of a remote desktop on a mobile device with a native layout, according to some embodiments.

FIG. 3 is an example flow diagram for displaying a window of a remote desktop on a mobile device with a native layout, according to some embodiments. Referring to both FIGS. 2 and 3, a method begins at block 302, where a system such as VNC server 202 receives a remote desktop display request from a mobile client device, where the remote desktop display request includes display information of the mobile client device. In some embodiments, the display information includes a size of the mobile device. In some embodiments, the display information includes a resolution of the mobile device.

In some embodiments, after receiving the remote desktop display request, VNC server 202 of desktop computer 102 may send messages to VNC client 204 of mobile device 102. This informs VNC client 204 of the width and height of the VNC server's frame buffers, pixel format, proper resolution range, etc. The following is example information that may be included in a remote desktop display request.

FIG. 4 is an example data structure that includes display information, according to some embodiments. Shown is a column 402 containing a number of bytes required for various types of display information. Also shown is a column 404 containing type values. Also shown is a column 406 containing descriptions of various types of display information. Also shown is a column 408 containing type values. In this particular example, the device size is 5.2" and the device resolution is 1980×1720.

At block 304, the system generates a copy of a window process of a remote desktop computer. In some embodiments, the copy of the window process is based on a fork operation. As will be understood by one of ordinary skill in the art, a fork operation is an operation whereby a process creates a copy of itself as a way to create new process: a parent process first forks to create a copy of itself, the child copy issues a system call to overlay itself with the parent process, and the parent process ceases operation. For example, when mobile device 104 connects to desktop computer 102, virtual display manager 206 forks the current window process by calling the system API. The copy of the window process may then be moved to a corresponding virtual display in a maximized display window.

At block 306, the system generates a virtual display based at least in part on the copy of the window process of the remote desktop computer and on the display information of the mobile client device. In some embodiments, the resolution of the remote desktop computer is preserved so as to allow for other mobile client devices to access the remote desktop computer. In some embodiments, the virtual display information includes frame buffer information.

At block 308, the system sends virtual display information to the mobile client device based at least in part on the virtual display. In some embodiments, the system invokes a frame buffer manager of the remote desktop computer, where the frame buffer manager communicates with a frame buffer manager of the mobile client device. As a result, content displayed in desktop computer is displayed based on the resolution of the display of the mobile device.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
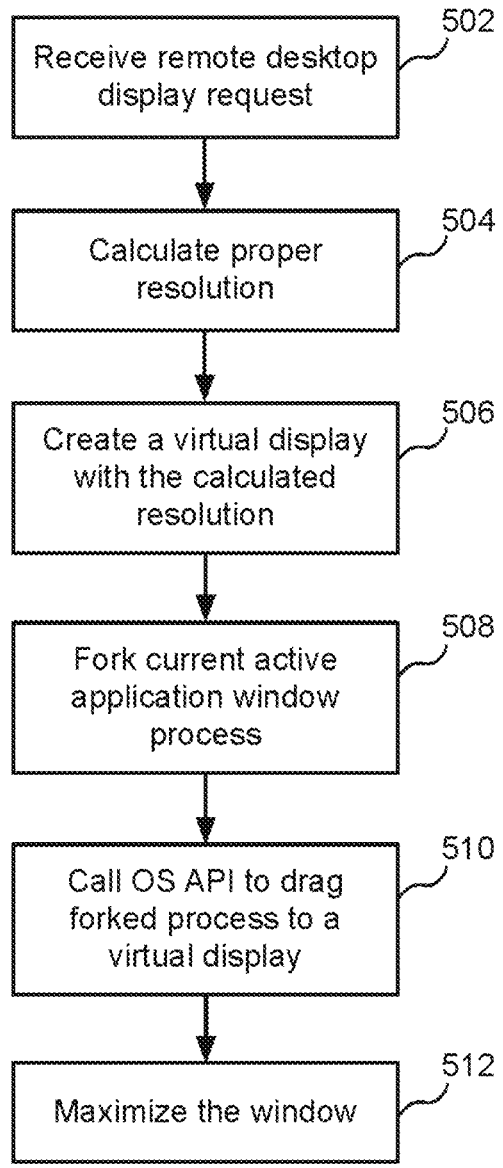
FIG. 5 is an example flow diagram for virtual display manager operations, according to some embodiments.

FIG. 5 is an example flow diagram for virtual display manager operations, according to some embodiments. Referring to both FIGS. 2 and 5, a method begins at block 502, where a system such as VNC server 202 receives a remote desktop display request from a VNC client of a mobile device such as VNC client 204 of mobile device 104.

At block 504, the system calculates a proper resolution for the mobile device. In some implementations, the system API may obtain the resolution of mobile device 104, and then send the resolution to VNC server 202.

At block 506, the system creates a virtual display with the calculated resolution.

At block 508, the system forks (copies) the current active window process.

At block 510, the system calls operating system (OS) application programming interface (API) in order to drag the forked process to a virtual display.

At block 512, the system maximizes the application window on remote desktop computer 102.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
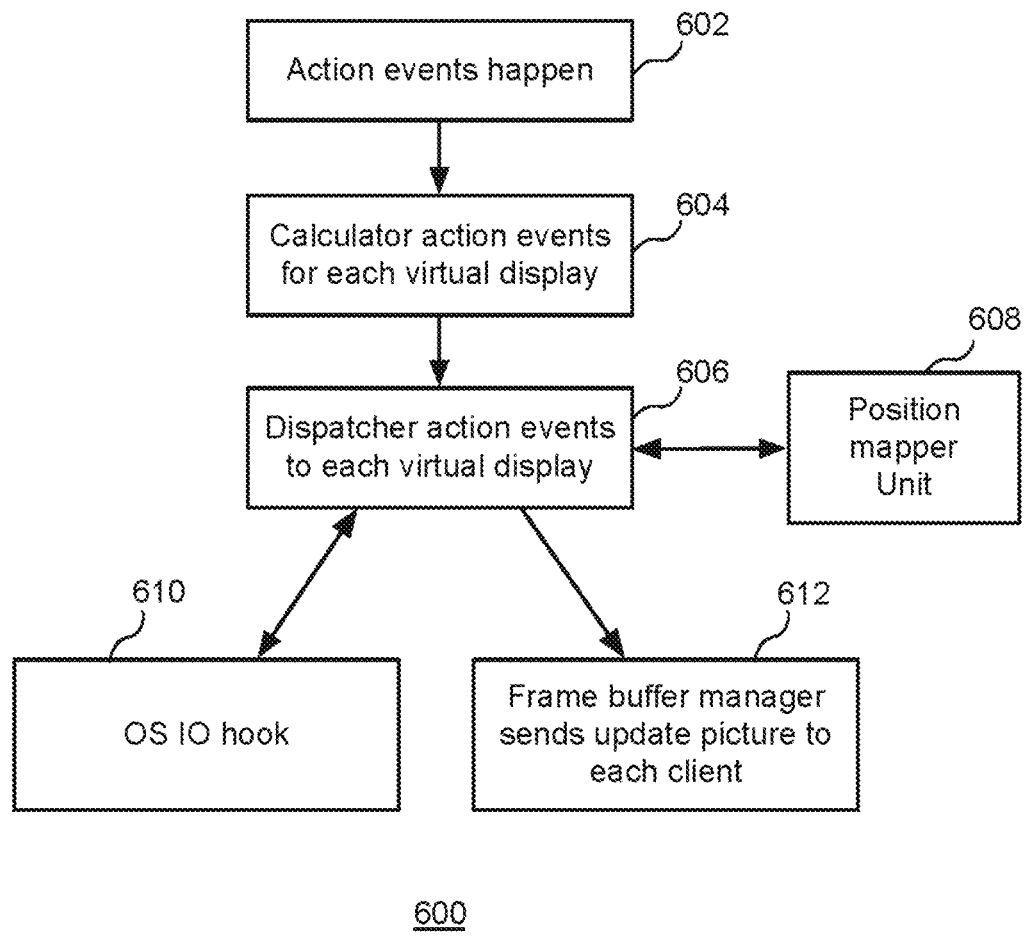
FIG. 6 is an example flow diagram for action calculator and dispatcher operations, according to some embodiments.

FIG. 6 is an example flow diagram for action calculator and dispatcher operations, according to some embodiments. Referring to both FIGS. 2 and 6, a method begins at block 602, where a system such as action calculator and dispatcher 208 detects action events (action events happen). In various embodiments, action events may include any user operation, such as the user clicking a save button, the user inputting text, etc. Example embodiments are described in more detail below.

At block 604, action calculator and dispatcher 208 synchronizes operations between different users such as determining each virtual displays, loop calls, etc.

At block 606, action calculator and dispatcher 208 determines loop build actions with correct positions and calls OS API to execute built actions if there are any UI changes. Action calculator and dispatcher 208 also sends out VNC frame buffer update for each virtual display.

In some embodiments, action calculator and dispatcher 208 uses an extended remote frame buffer protocol to determine mobile device size and resolution for a given mobile device, handles frame buffer requests with resolution range data, and handles frame buffer updates with resolution. Action calculator and dispatcher 208 retrieves an action, calculates which action needs to be done, and sends such actions to each display.

Virtual display manager 206 invokes frame buffer manager 216 of VNC server 202 to send pictures to frame buffer manager 224 of VNC client 204.

At block 608, a position mapper unit determines the type of update. For example, in some embodiments, one type of update may include non-editing updates (e.g., a user click a save button). In some embodiments, another type of update may include input to an editing area. Example embodiments directed to these types of updates are described in more detail below.

At block 610, an OS IO hook ensures that only write data is written to disk.

At block 612, the frame buffer manager sends updated pictures to each mobile device. In some embodiments, after an action is executed in a virtual display, and if the UI is changed, the frame buffer manager generates a frame buffer update message and then sends the frame buffer update message to the VNC client.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 7:
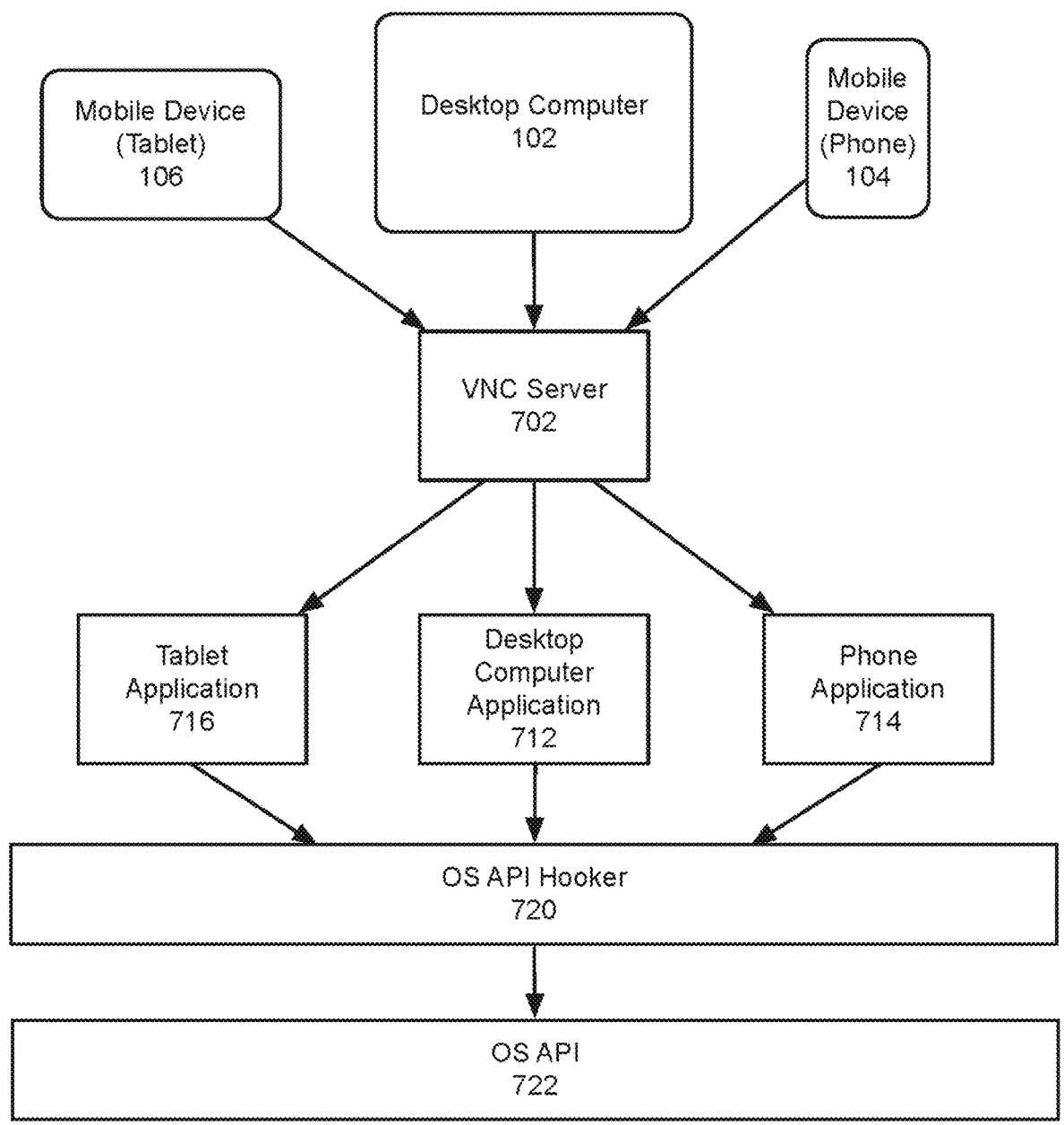
FIG. 7 is a block diagram of a system for displaying a window of a remote desktop on a mobile device with a native layout, according to some embodiments.

FIG. 7 is a block diagram of a system for displaying a window of a remote desktop computer on a mobile device with a native layout, according to some embodiments. Shown are desktop computer 102, mobile device (phone) 104, mobile device (tablet) 106, a VNC server 702, a desktop computer application 712, a phone application 714, a tablet application 716, an OS API Hooker 720, and an OS API 722.

In some embodiments, OS API hooker 720 operates at the same time of each of N processes (e.g., main process and N−1 process fork). After a write operation, OS API hooker 720 determines that the operation of the main process is passed to the OS. The potential error of writing N times (N is the number of clients) is avoided. The result of the write operation is returned by OS API hooker 720 to several other processes.

In some embodiments, if the mobile phone user clicks the save button, a user interface (UI) change is triggered. Both the virtual screen of mobile device 104, and the main screen of desktop computer 102 trigger the click operation correspondingly. The UI is updated through the existing mechanism of VNC server 202. The UI on desktop computer 102, mobile device 104, and other mobile devices connected to desktop computer 102 such as mobile device 106 is updated accordingly.

FIG. 8 is an example mapping table 800 that includes display information, according to some embodiments. Shown is a column 802 containing an index number. Also shown is a column 804 containing handle ID, position, and size information for desktop computer 102, or main device (labeled "Main"). Also shown is a column 806 containing handle ID, position, and size information for mobile device 104 (labeled "Mobile"). Also shown is a column 808 containing handle ID, position, and size information for mobile device 106 (labeled "Pad"). Also shown is a column 810 containing a name of a control button "Save."

Figure 9:
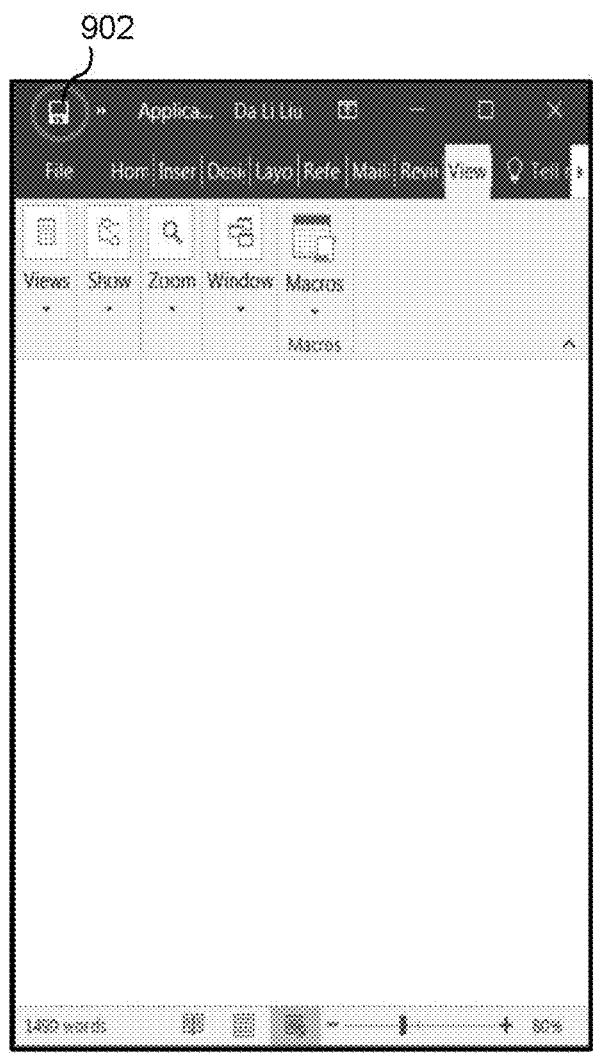
FIG. 9 is an example screenshot of a window for a phone mobile device, according to some embodiments.

FIG. 9 is an example screenshot of a window 900 for a phone mobile device, according to some embodiments. Shown is a save button 902 that a user may select. In various embodiments, if a user selects or clicks the save button in the display screen of mobile device 102, e.g., at position (50, 30) of the display screen of mobile device 102. Action calculator and dispatcher 208 determines that the click occurred at the save button in the virtual display of mobile device 104. VNC client 204 of mobile device 104 sends the mobile screen operation to VNC server 202 of desktop computer 102 (e.g., via the VNC existing mouse keyboard event mapping, etc.). The action of saving effectuates a "save" in the menu in the main window of desktop computer 102.

In some embodiments, action calculator and dispatcher unit 208 determines the mapping relationship between handle IDs and location, knows that the Save button is in the main screen position (400, 300). Action calculator and dispatcher unit 208 calls the system API to simulate the main screen (400,300) in response to the save button on the main screen being selected.

In some embodiments, VNC server 202 may perform the same operation on processes other than the main screen and on non-initiator virtual displays (e.g., virtual displays of mobile device 106, etc.). Action calculator and dispatcher unit 208 may determine the virtual display of the other mobile device 106 virtual display by determining the mapping relationship between the handle IDs and the position. For example, the corresponding position may be (60, 40). Action calculator and dispatcher 208 invokes the system API to simulate the click operation of the mouse at position (60, 40). This selects the save button on the virtual display of mobile device 106.

In some embodiments, the system may divide location mapping into two situations. The first involves non-editing units, such as menus, toolbars, including a save button. The second situation involves an input editing area, such as a word processor document editing area.

Figure 10:
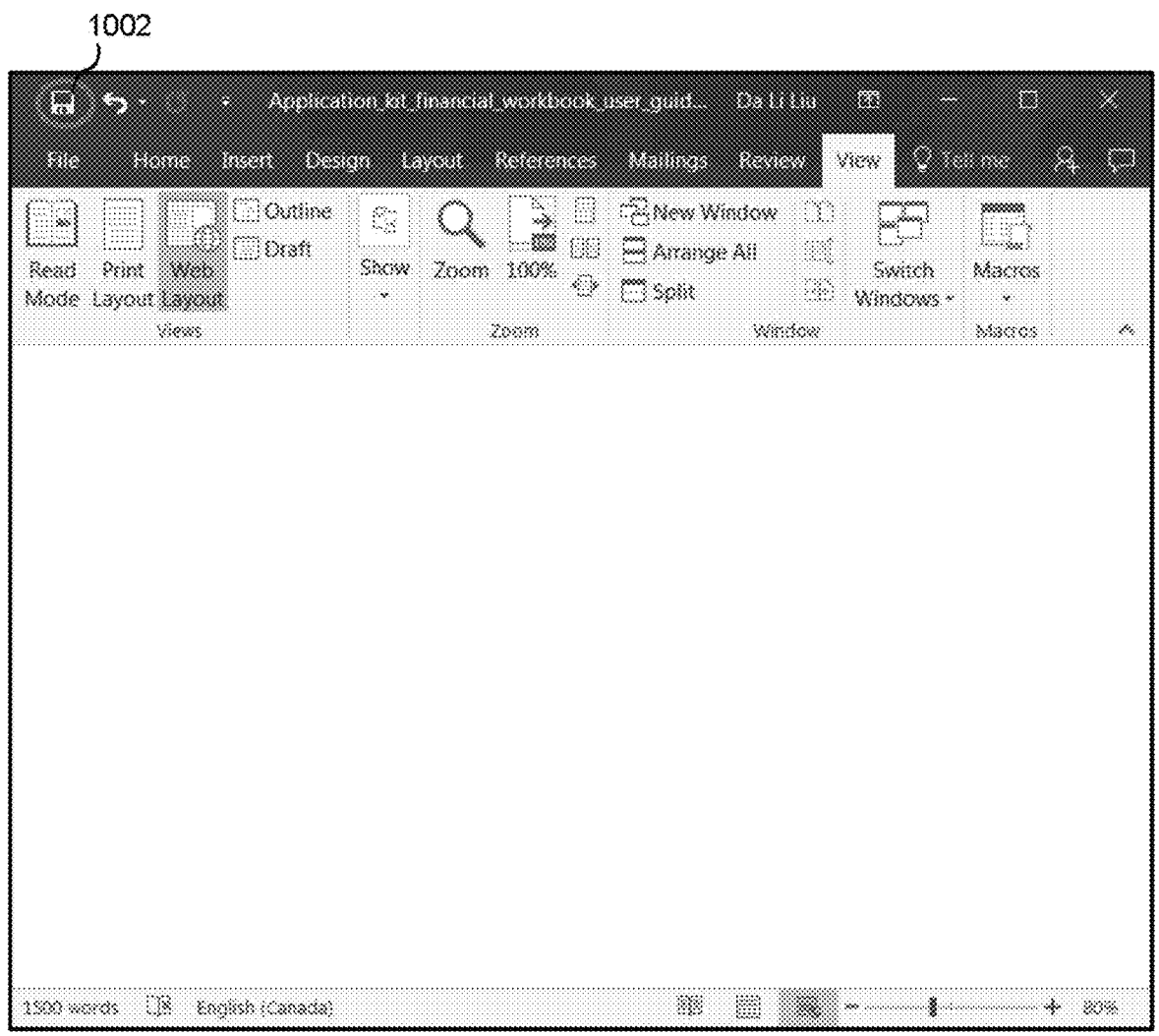
FIG. 10 is an example screenshot of a window displayed on a desktop computer, according to some embodiments.

FIG. 10 is an example screenshot of a window 1000 displayed on a desktop computer, according to some embodiments. Shown is a save button 1002 that a user may select on a mobile device such as mobile device 104.

In various embodiments, action calculator and dispatcher 208 synchronizes actions from different remote mobile client devices. In some embodiments, action calculator and dispatcher 208 traverses the handles of all current windows through the system API, establishes a mapping table of handler IDs and positions, and creates a character position mapping table by traversing characters in the editing area. In some embodiments, process handles may be integer values that identify processes.

Action calculator and dispatcher 208 establishes a mapping table of handler identifiers (IDs) and positions. Action calculator and dispatcher 208 then creates a character position mapping table by traversing characters in the editing area. Action calculator and dispatcher 208 synchronizes actions between different mobile devices through mapping tables.

FIG. 11A is an example mapping table 1100 that includes display information, according to some embodiments. Shown is a column 1102 containing an index number. Also shown is a column 1104 containing position information for desktop computer 102, or main device (labeled "Main"). Also shown is a column 1106 containing position information for mobile device 104 (labeled "Mobile"). Also shown is a column 1108 containing position information for mobile device 106 (labeled "Pad"). Also shown is a column 1110 containing characters that occupy the position indicated in the position information. For example, there is a period (".") at position 480, 100 on desktop computer 102, at position 370, 400 of mobile device 104, and at position 400, 500 of mobile device 106. Also, there is a letter "T" at position 400, 110 on desktop computer 102: at position 20, 430 of mobile device 104: and at position 30, 530 of mobile device 106.

FIG. 11B is an example mapping table 1100 that includes display information, according to some embodiments. As shown, the period (".") remains at position 480, 100 on desktop computer 102, at position 370, 400 of mobile device 104, and at position 400, 500 of mobile device 106. The letter "T" remains at position 400, 110 on desktop computer 102, at position 20, 430 of mobile device 104, and at position 30, 530 of mobile device 106.

In this example, a new row with index 308 is added when the user clicks on a particular position (500,100) in the current editing area on the display screen.

Action calculator and dispatcher 208 determines via mapping table 1100 that the input operation (e.g., a letter "A" being typed) has occurred after the 307th character of the current editing area of the main screen, for example. Action calculator and dispatcher 208 updates the character position mapping table as shown in the following example.

FIG. 11C is an example mapping table 1100 that includes display information, according to some embodiments. As shown, the period (".") remains at position 480, 100 on desktop computer 102, at position 370, 400 of mobile device 104, and at position 400, 500 of mobile device 106. The letter "T" also remains at position 400, 120 on desktop computer 102, at position 20, 430 of mobile device 104, and at position 30, 530 of mobile device 106.

In this example, a new row associated with index 308 contains a letter "A." As shown in mapping table 1100, the letter "A" was added at desktop computer 102 and has not yet been displayed at mobile devices 104 and 106. The system then adds the letter "A" after the 307th character of the mobile phone virtual screen, and records the location information to the character location mapping table, for example.

FIG. 11D is an example mapping table 1100 that includes display information, according to some embodiments. As shown, the period (".") remains at position 480, 100 on desktop computer 102, at position 370, 400 of mobile device 104, and at position 400, 500 of mobile device 106. The letter "T" also remains at position 400, 120 on desktop computer 102, at position 20, 430 of mobile device 104, and at position 30, 530 of mobile device 106. In this example, a new row associated with index 308 contains a letter "A." As shown, the letter "A" was added at desktop computer 102 and mobile devices 104 and 106.

Figure 12:
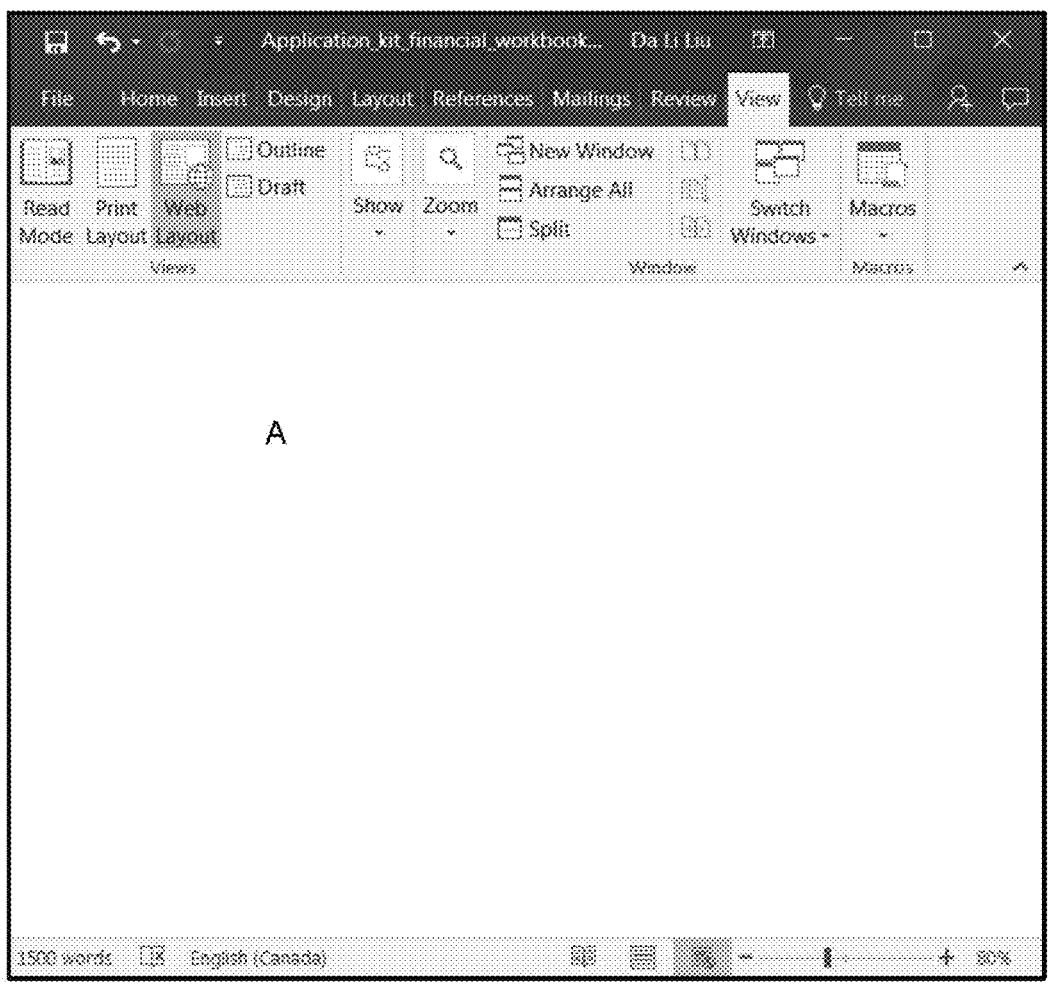
FIG. 12 is an example screenshot of a window for a desktop computer, according to some embodiments.

FIG. 12 is an example screenshot of a window 1200 for a desktop computer, according to some embodiments. Shown is a letter "A" that has been added to the editing area.

Figure 13:
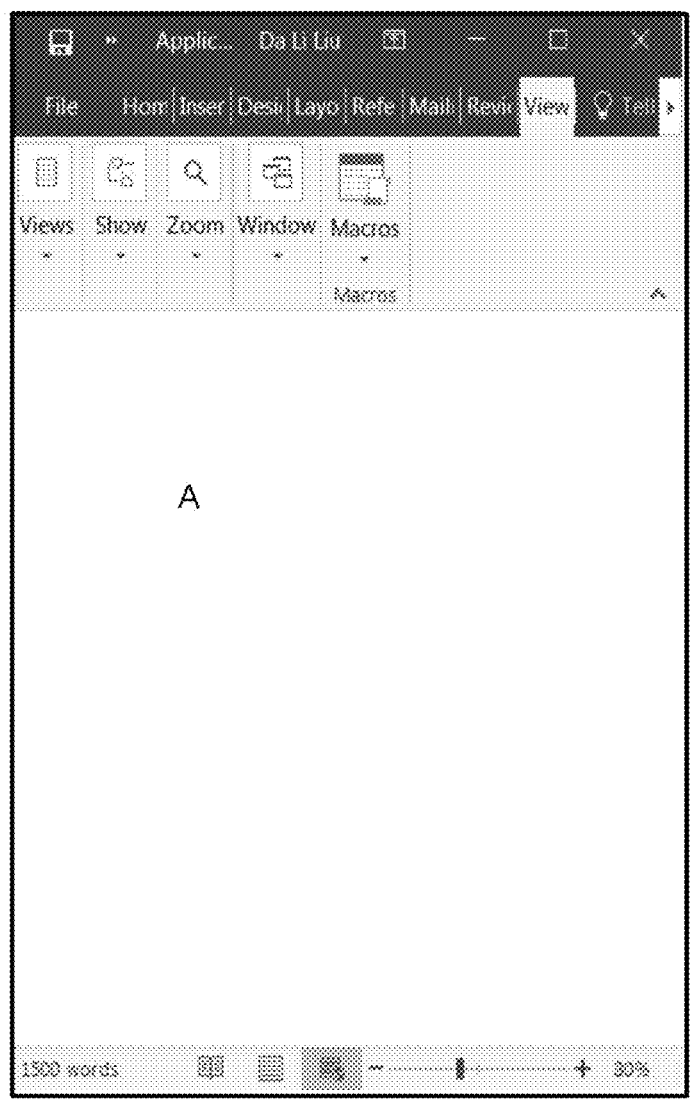
FIG. 13 is an example screenshot of a window for a phone mobile device, according to some embodiments.

FIG. 13 is an example screenshot of a window 1300 for a phone mobile device, according to some embodiments. Shown is a letter "A" that has been added to the editing area.

Embodiments described herein provide various benefits. For example, embodiments enable a user to operate a remote desktop computer with a mobile device having a small screen. Embodiments also enable different users view a large-size remote desktop computer based on the device screen size of their respective mobile devices. Furthermore, the display size of a given mobile device does not affect other mobile devices connected to a given desktop computer. Operations among devices may be synchronized in real time.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 14:
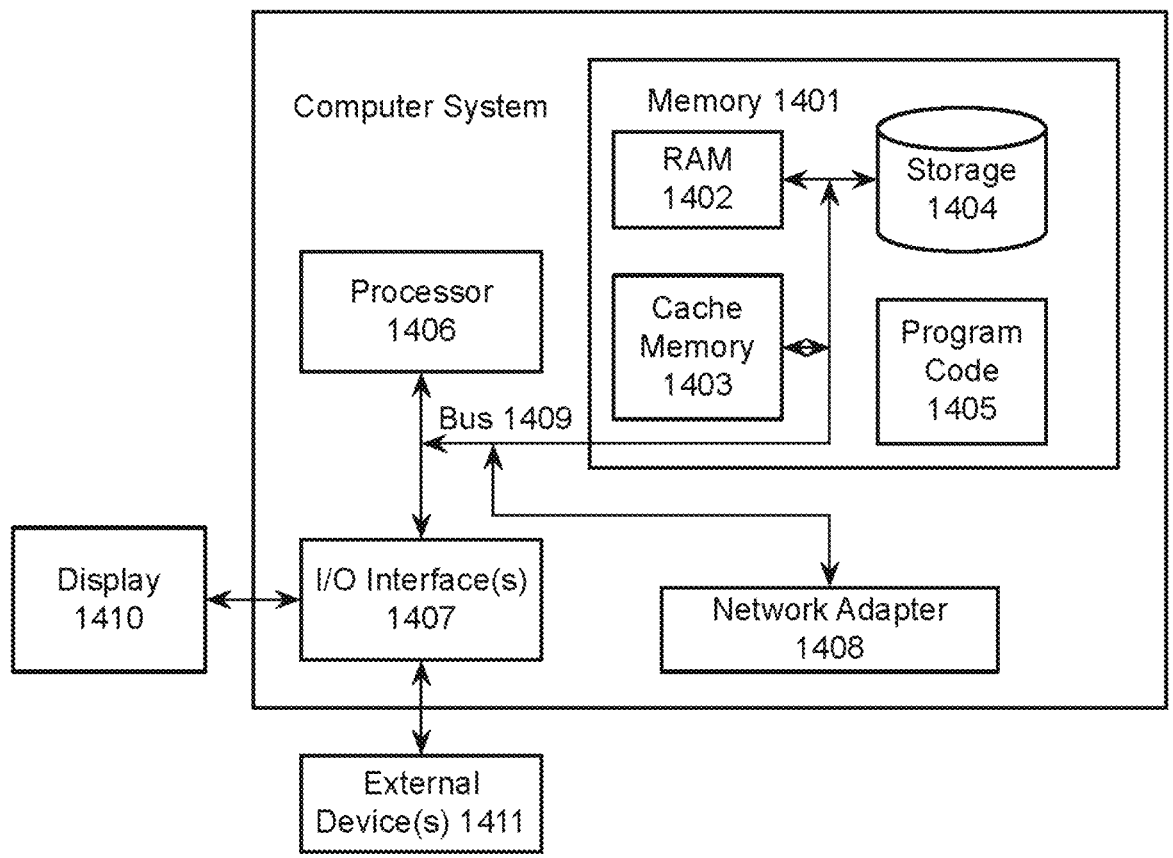
FIG. 14 is a block diagram of an example computer system, which may be used for embodiments described herein.

FIG. 14 is a block diagram of an example computer system 1400, which may be used for embodiments described herein. The computer system 1400 is operationally coupled to one or more processing units such as processor 1406, a memory 1401, and a bus 1409 that couples various system components, including the memory 1401 to the processor 1406. The bus 1409 represents one or more of any of several types of bus structure, including a memory bus or memory controller, a peripheral bus, an accelerated graphics port, and a processor or local bus using any of a variety of bus architectures. The memory 1401 may include computer readable media in the form of volatile memory, such as random access memory (RAM) 1402 or cache memory 1403, or storage 1404, which may include non-volatile storage media or other types of memory. The memory 1401 may include at least one program product having a set of at least one program code module such as program code 1405 that are configured to carry out the functions of embodiment of the present invention when executed by the processor 1406. The computer system 1400 may also communicate with a display 1410 or one or more other external devices 1411 via input/output (I/O) interfaces 1407. The computer system 1400 may communicate with one or more networks via network adapter 1408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising: at least one processor and a computer readable storage medium having program instructions embodied therewith, the program instructions executable by the at least one processor to cause the at least one processor to perform operations comprising:
   receiving a remote desktop display request from a mobile client device, wherein the remote desktop display request includes display information of the mobile client device, and wherein the display information comprises a screen size of the mobile client device;
   generating a copy of a window process of a remote desktop computer, the copy of the window process created based on a fork operation, wherein the fork operation creates a parent copy of the window process via forking, a child copy issues a call to overlay itself with the parent copy, and the parent copy ceases operation;
   computing a screen size and a resolution of the window process by the remote desktop computer that is appropriate for the mobile client device;
   generating a virtual display based at least in part on the screen size, on the resolution, on the copy of the window process of the remote desktop computer, and on the display information of the mobile client device; and
   sending virtual display information to the mobile client device to be displayed in a full screen of the mobile client device based at least in part on the virtual display, a resolution of the remote desktop computer preserved so as to allow for mobile client devices to access the remote desktop computer.

2. The system of claim 1, wherein the at least one processor further performs operations comprising;
   determining one or more update types; and
   sending one or more updates to the mobile client device, wherein the one or more updates update the virtual display based on the update types.

3. The system of claim 1, wherein the display information includes a resolution of the mobile device.

4. The system of claim 1, wherein the virtual display information includes frame buffer information.

5. The system of claim 1, wherein the at least one processor further performs operations comprising invoking a frame buffer manager of the remote desktop computer, wherein the frame buffer manager communicates with a frame buffer manager of the mobile client device.

6. The system of claim 1, wherein a system API obtains a resolution of the mobile client device.

7. A computer program product comprising a non-transitory computer readable storage medium having program instructions embodied therewith, the program instructions executable by at least one processor to cause the at least one processor to perform operations comprising:
   receiving a remote desktop display request from a mobile client device, wherein the remote desktop display request includes display information of the mobile client device, and wherein the display information comprises a screen size of the mobile client device;
   generating a copy of a window process of a remote desktop computer, the copy of the window process created based on a fork operation, wherein the fork operation creates a parent copy of the window process via forking, a child copy issues a call to overlay itself with the parent copy, and the parent copy ceases operation;
   computing a screen size and a resolution of the window process by the remote desktop computer that is appropriate for the mobile client device;
   generating a virtual display based at least in part on the screen size, on the resolution, on the copy of the window process of the remote desktop computer, and on the display information of the mobile client device, and sending virtual display information to the mobile client device to be displayed in a full screen of the mobile client device based at least in part on the virtual display, a resolution of the remote desktop computer preserved so as to allow for mobile client devices to access the remote desktop computer.

8. The computer program product of claim 7, wherein the at least one processor further performs operations comprising:

determining one or more update types; and sending one or more updates to the mobile client device, wherein the one or more updates update the virtual display based on the update types.

9. The computer program product of claim 7, wherein the display information includes a resolution of the mobile device.

10. The computer program product of claim 7, wherein the virtual display information includes frame buffer information.

11. The computer program product of claim 7, wherein the at least one processor further performs operations comprising invoking a frame buffer manager of the remote desktop computer, wherein the frame buffer manager communicates with a frame buffer manager of the mobile client device.

12. A computer-implemented method for displaying a window of a remote desktop on a mobile device with a native layout, the method comprising:

receiving a remote desktop display request from a mobile client device, wherein the remote desktop display request incudes display information of the mobile client device, and wherein the display information comprises a screen size of the mobile client device;

generating a copy of a window process of a remote desktop computer, the copy of the window process created based on a fork operation, wherein the fork operation creates a parent copy of the window process via forking, a child copy issues a call to overlay itself with the parent copy, and the parent copy ceases operation;

computing a screen size and a resolution of the window process by the remote desktop computer that is appropriate for the mobile client device;

generating a virtual display based at least in part on the screen size, on the resolution, on the copy of the window process of the remote desktop computer, and on the display information of the mobile client device; and sending virtual display information to the mobile client device to be displayed in a full screen of the mobile client device based at least in part on the virtual display, a resolution of the remote desktop computer preserved so as to allow for mobile client devices to access the remote desktop computer.

13. The method of claim 12, further comprising:
determining one or more update types; and
sending one or more updates to the mobile client device, wherein the one or more updates update the virtual display based on the update types.

14. The method of claim 12, wherein the display information includes a resolution of the mobile device.

15. The method of claim 12, wherein the virtual display information includes frame buffer information.

* * * * *